United States Patent
Byun

(10) Patent No.: US 8,837,308 B2
(45) Date of Patent: Sep. 16, 2014

(54) POWER EFFICIENT LINK GROUP COMMUNICATION APPARATUS AND METHOD

(75) Inventor: Sung Hyuk Byun, Daejeon-si (KR)

(73) Assignee: Electronics and Telecommunications Research Institute, Daejeon (KR)

(*) Notice: Subject to any disclaimer, the term of this patent is extended or adjusted under 35 U.S.C. 154(b) by 551 days.

(21) Appl. No.: 12/908,466

(22) Filed: Oct. 20, 2010

(65) Prior Publication Data

US 2011/0103246 A1    May 5, 2011

(30) Foreign Application Priority Data

Nov. 4, 2009  (KR) .................. 10-2009-0106079
Jul. 8, 2010   (KR) .................. 10-2010-0065927

(51) Int. Cl.
  *H04L 12/26*  (2006.01)
  *H04L 12/12*  (2006.01)
  *H04L 12/835* (2013.01)
  *H04L 12/801* (2013.01)

(52) U.S. Cl.
  CPC ............ *H04L 43/0894* (2013.01); *H04L 47/10* (2013.01); *H04L 12/12* (2013.01); *H04L 43/16* (2013.01); *H04L 47/30* (2013.01); *Y02B 60/33* (2013.01); *Y02B 60/34* (2013.01)

USPC ........................................... 370/252

(58) Field of Classification Search
  CPC ........................................ H04L 47/10
  USPC ........................................... 370/252
  See application file for complete search history.

(56) References Cited

U.S. PATENT DOCUMENTS

| | | | |
|---|---|---|---|
| 7,274,929 B1* | 9/2007 | Banginwar ............... | 455/418 |
| 2003/0191854 A1* | 10/2003 | Hsu et al. ................ | 709/233 |
| 2004/0223452 A1* | 11/2004 | Santos et al. ............ | 370/229 |
| 2005/0286488 A1* | 12/2005 | Briscoe et al. ........... | 370/351 |
| 2007/0254608 A1* | 11/2007 | Bougard ................... | 455/103 |
| 2008/0304519 A1* | 12/2008 | Koenen et al. ........... | 370/477 |
| 2009/0186648 A1* | 7/2009 | Larsson ................... | 455/522 |
| 2010/0011230 A1* | 1/2010 | Mater ...................... | 713/320 |
| 2011/0051734 A1* | 3/2011 | Cardona et al. .......... | 370/400 |

* cited by examiner

*Primary Examiner* — Mark Rinehart
*Assistant Examiner* — Christopher R Crompton
(74) *Attorney, Agent, or Firm* — Staas & Halsey LLP

(57) ABSTRACT

A power-efficient link group-based communication system is provided. In link group-based communication, according to the amount of transmitted traffic, an appropriate number of links in a link group are set to active mode to be used for traffic transmission, and the rest of the links in the link group are set to power save mode, thereby not transmitting traffic. Thus, efficient power reduction in the link group-based communication can be realized.

10 Claims, 4 Drawing Sheets

POWER EFFICIENT LINK GROUP COMMUNICATION APPARATUS AND METHOD

CROSS-REFERENCE TO RELATED APPLICATION(S)

This application claims the benefit under 35 U.S.C. §119 (a) of Korean Patent Application Nos. 10-2009-0106079, filed on Nov. 4, 2009, and 10-2010-0065927, filed on Jul. 8, 2010, the entire disclosures of which are incorporated herein by references for all purposes.

BACKGROUND

1. Field

The following description relates to a link group-based communication system that efficiently reduces power, and more particularly, to a technique for reducing power in a link group-based communication system which logically groups a plurality of links in order to a logical link with a bandwidth greater than an individual link bandwidth.

2. Description of the Related Art

Generally, switches, routers, and servers employ a link group-based communication system which generates a link group of a plurality of physical links to logically operate the link group as a single link.

Typically, in Ethernet, a logical link of several gigabits of bandwidth is generated by grouping multiple gigabit Ethernet interfaces using standard link aggregation. In addition to the Ethernet, in interfaces, for example, packet over SONET (PoS), a logic interface with a high bandwidth may be formed through logical link group generation.

By generating such a link group, traffic toward the link group can be evenly distributed to all member links so that the links can process traffic greater than an individual link bandwidth. However, the above method uses all links even when the amount of traffic is small, thereby wasting system resources or power.

SUMMARY

In one general aspect, provided is a link group-based communication apparatus in a communication system that transmits and receives packets to/from an adjacent node connected with a plurality of physical links, the link group-based communication apparatus including: a link group management unit configured to group the plurality of physical links to form a link group, and set whether each of the physical links belonging to the link group is activated for packet transmission or not; a traffic distribution unit configured to distribute packets to physical links of the link group which are set to be activated for packet transmission and transmit the packets through the activated physical links to the adjacent node; and a link status monitoring unit configured to measure an average amount of traffic transmitted through the physical links set to be activated for packet transmission, and transmit the measured average traffic amount to the link group management unit.

The plurality of physical links may include physical links having the same transfer rate, or having different transfer rates.

The link group management unit may be further configured to set some physical links belonging to the link group to active mode for packet transmission and the rest of the physical links to power save mode in which the physical links do not perform packet transmission, according to the average traffic amount.

The link group management unit may be further configured to switch a mode of each of physical links belonging to one link group from active mode to power save mode or from power save mode to active mode according to the average traffic amount received from the link status monitoring unit.

The traffic distribution unit may be further configured to, when the link group management unit switches the mode of physical links from active mode to power save mode, redistribute traffic that has been distributed to the physical links which are switched to power save mode to physical links in active mode.

The traffic distribution unit may be further configured to, when the link group management unit switches mode of physical links from power save mode to active mode, redistribute some traffic that has been distributed to physical links which were previously set to active mode to the physical links which are switched to active mode.

The link group-based communication apparatus may further include link buffers configured to be placed at front ends of the respective physical links and temporally store packets distributed from the traffic distribution unit.

The link status monitoring unit may be further configured to calculate an average of lengths of link buffers, which are connected with active mode physical links belonging to the link group, and measure an average amount of traffic transmitted through the physical links using the average of lengths.

The average of lengths of link buffers may be calculated by calculating an average length of link buffers connected with active mode physical links of the link group at set intervals and calculating a moving average of the calculated average length for a time window period of a specific length.

In another general aspect, provided is a link group-based communication method of a communication system that transmits and receives packets to/from an adjacent node connected through a plurality of physical links, the link group-based communication method including: forming a link group including the plurality of physical links; setting some physical links of the link group to active mode for performing packet transmission and the rest of the physical links to power save mode in which the physical links do not perform packet transmission, according to the average traffic amount; distributing packets to the active mode physical links of the link group and transmitting the packets through the active mode physical links; measuring an average amount of traffic transmitted through the active mode physical links of the link group; and according to the measured average traffic amount, switching a mode of physical links from active mode to power save mode or from power save mode to active mode.

The link group-based communication method may further include: when the average of lengths of link buffers used for storage is smaller than a previously set minimum threshold, selecting physical links to be switched from active mode to power save mode from among the active mode physical links of the link group according to a difference between the minimum threshold and the average of lengths of link buffers used for storage; redistributing traffic which has been previously allocated to the selected physical links to the active mode physical links other than the selected physical links; and switching a mode of the selected physical links to power save mode.

The link group-based communication method may further include: when the average of lengths of link buffers used for storage is greater than a previously set maximum threshold, selecting physical links to be switched from power save mode to active mode from among power save mode physical links of the link group according to a difference between the maximum threshold and the average of lengths of link buffers used for storage; switching a mode of the selected physical links to active mode; and redistributing some traffic to be transmitted through physical links which have been previously set to active mode to the physical links switched to active mode.

Other features and aspects will be apparent from the following detailed description, the drawings, and the claims.

Figure 1:
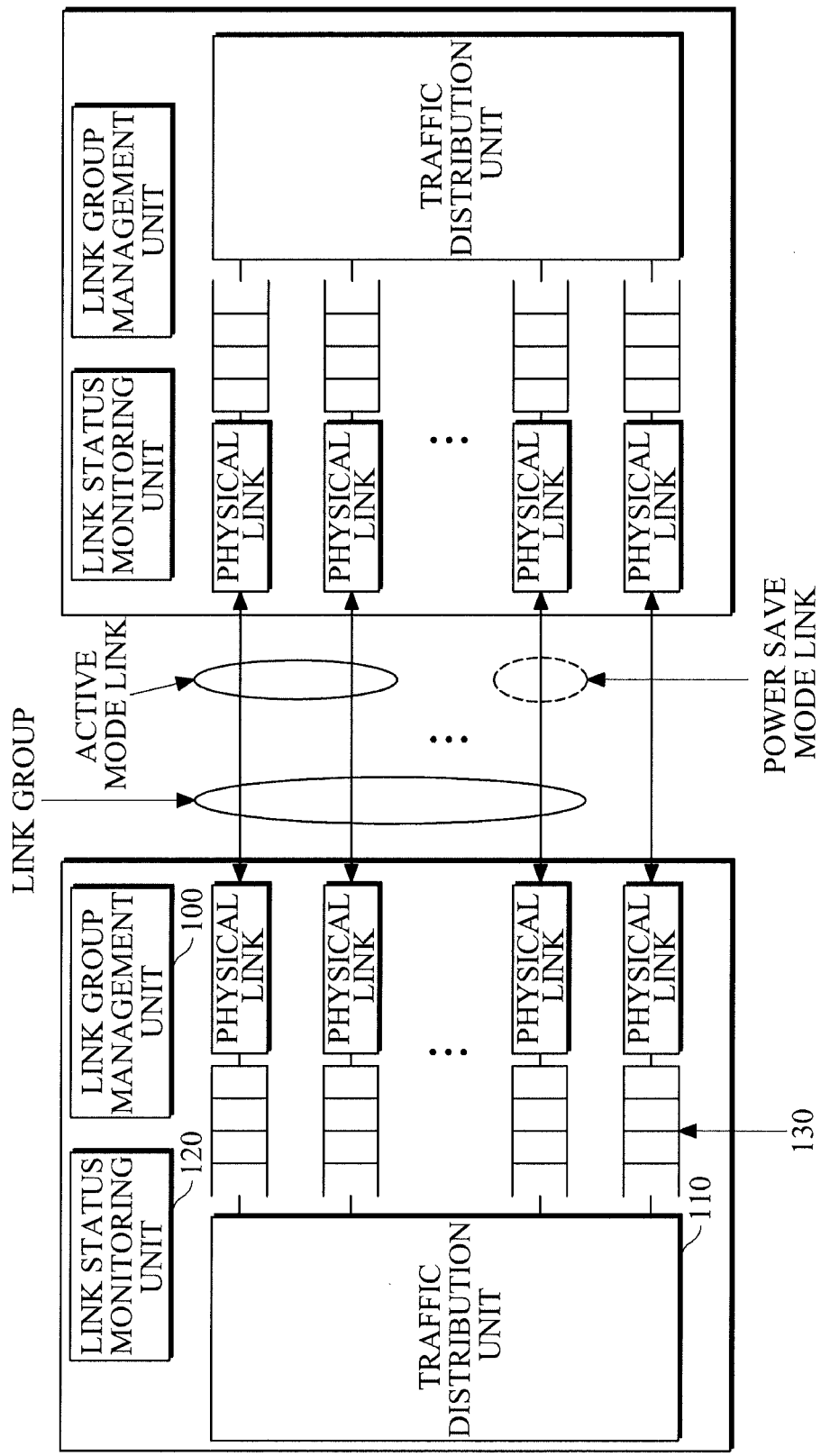
FIG. 1 is a diagram illustrating an example of a communication system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a communication system.

The communication system in the example shown in FIG. 1 is a system that includes a plurality of physical links and performs data transmission on a packet-by-packet basis. Examples of the communication system may include a server, a switch, a router, and the like. The link in the example shown in FIG. 1 is a physical communication interface, which may be a general communication interface, for example, an Ethernet, a passive optical network (PON), a packet over SONET (PoS), a wireless LAN, CDMA, Global System for Mobile communication (GSM), or the like.

Referring to the example shown in FIG. 1, the communication system may include a link group management unit 100, a traffic distribution unit 110, a link status monitoring unit 120, and link buffers 130. More specifically, the communication system may include one or more physical links, the link buffers 130 connected with the respective physical links, the link status monitoring unit 120 that monitors the length of each link buffer 130, the traffic distribution unit 110 that sends packet traffic to an output link, and the link group management unit 100 that forms a link group and manages members of the link group.

When a high-bandwidth communication channel is required for communication with an adjacent system, the link group management unit 100 groups an appropriate number of physical links to form a link group and sets modes of individual links if needed. One or more link groups may be set in a system, and the link group management unit 100 may manage the link groups individually.

The links belonging to the link group may be either in active mode or power save mode. When a link is in active mode, traffic can be transmitted through the link at a set transfer rate of the link, and in the case of Ethernet that supports multi-rate mode of 10 Mbps, 100 Mbps, and up to 1 Gbps, the active mode in the example shown in FIG. 1 may include all the three rate modes.

When a link is in power save mode, the link cannot transmit packets, that is, the link is in an idle state.

The power save mode may vary according to implementation of a system that manages links. For example, the power save mode may completely shut down the power to a corresponding link, or supply to a corresponding link the minimum amount of power required to maintain connection to the corresponding communication system.

The link buffers 130 indicate storage space where packets to be transmitted through physical links are stored.

The traffic distribution unit 110 may distribute packet traffic toward each link group appropriately to physical links belonging to each link group. The traffic distribution unit 110 may be implemented to, for example, hash header information of each packet, and allocate packets to links according to the hashing result such that packets of the same flow can be transmitted through physical links of the same link group. Additionally, the traffic distribution unit 110 may employ various distribution methods, and is not limited to the above method.

The link status monitoring unit 120 may monitor a length of each link buffer 130, calculate an average length of link buffers connected with links in active mode of each link group within a set time period, and maintain the calculated value.

For example, to calculate an average length of link buffers of each link group, an average of lengths of link buffers in active mode in each link group within a unit time is calculated, and a moving average for a time window period of a predetermined duration is obtained from the calculated average of lengths. The example shown in FIG. 1 may employ various calculation methods other than the above link status monitoring method.

Figure 2:
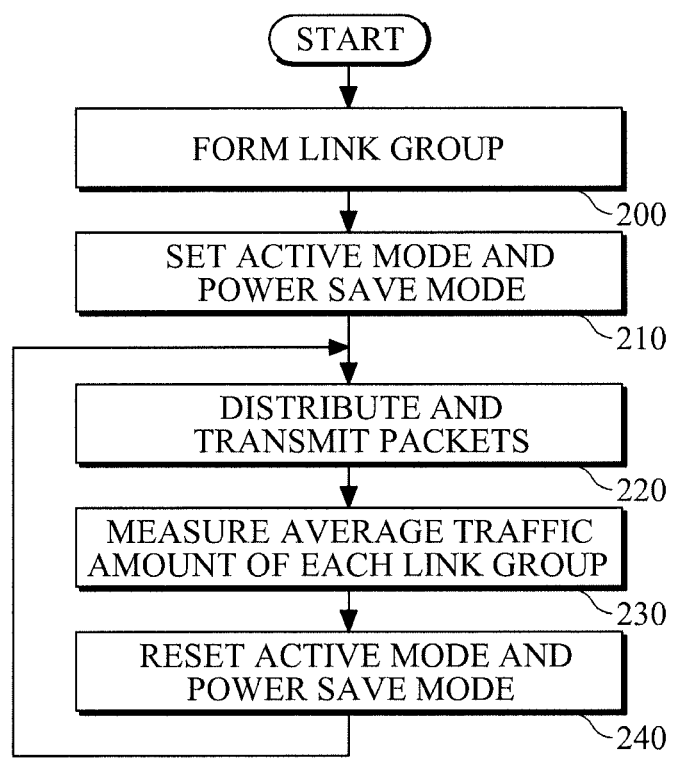
FIG. 2 is a flowchart illustrating an example of a link group-based communication method.

FIG. 2 illustrates a flowchart of an example of a link group-based communication method.

First, in a communication system that transmits and receives packets to/from an adjacent node through a plurality of physical links connected with the node, the physical links connected with the adjacent node are grouped together to form a link group (200).

According to the amount of traffic to be transmitted, some physical links in the link group are set to active mode in which the physical links perform packet transmission, and the rest of the physical links are set to power save mode in which the physical links do not perform packet transmission (210).

Packets are transmitted in a distribution manner through the physical links in the link group which have been set to active mode (220).

An average amount of traffic that is transmitted through the physical links of the link group which are in active mode is measured (230), and the modes of some physical links in the link group are switched to either active mode or power save mode according to the measured average traffic amount (240).

In this case, the capacity of the physical links that are currently set to active mode is not sufficient to perform packet transmission, in comparison with the measured average traffic amount, some physical links in power save mode are switched to active mode, and when the measured average traffic amount is quite small compared to the total capacity of active links, physical links in active mode are switched to power save mode.

Figure 3A:
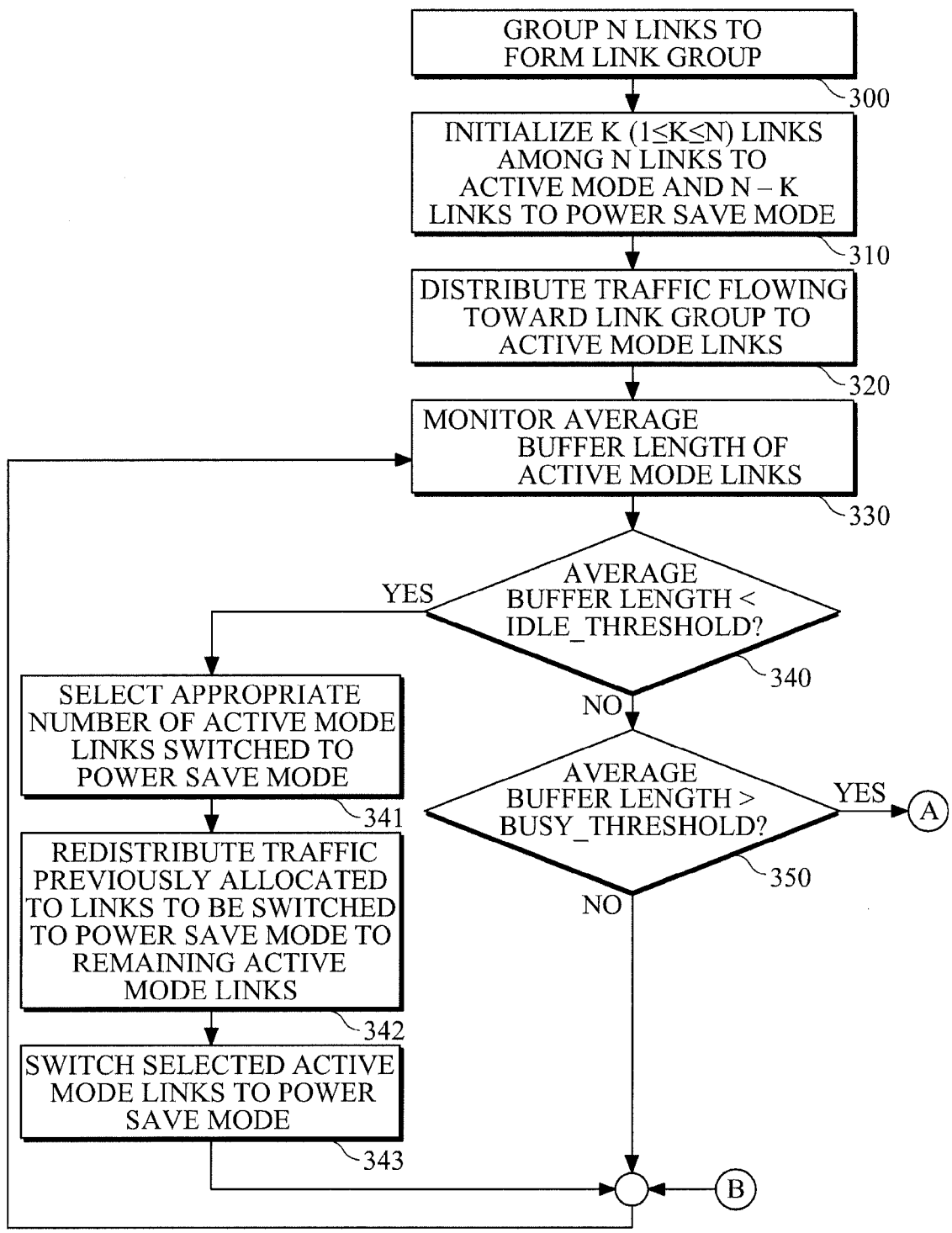
FIGS. 3A to 3B are flowcharts showing the link group-based communication method in the example illustrated in FIG. 2 in detail.
Figure 3B:
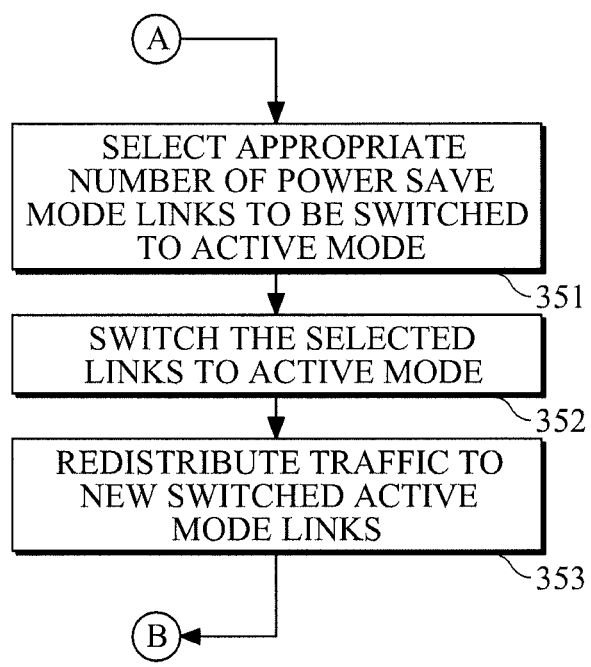

FIGS. 3A to 3B illustrate flowcharts showing the link group-based communication method in the example illustrated in FIG. 2 in detail.

With reference to FIGS. 3A and 3B, detailed operation of the link group-based communication apparatus shown in the example illustrated in FIG. 1 is described below.

The link group management unit 100 groups N links into a link group in response to a user's setting or signaling protocol (300). The link group setting is required to be performed in both systems which are connected by the N physical links, and the link group setting may be implemented through agreement by signaling about link group generation, or through an administrator's setting.

In a link group including N links, k links (1≤k≤N) are designated to be set to active mode for packet transmission, and the number k is determined by initial setting or an algorithm which predicting the traffic amount, and the rest of the links are set to power save mode in which the links are in an idle state (310).

When particular physical links in the link group are set to a specific mode, a peer system which is connected through the physical links is required to set the corresponding physical links to the same specific mode, and the above link mode setting may be implemented through negotiation by mutual communication between both systems or through setting by use of an external control server.

The traffic distribution unit 110 distributes and transmits traffic traveling toward each link group only to the physical links in active mode according to an appropriate method (320).

In this case, the link status monitoring unit 120 periodically calculates an average length of link buffers connected with the physical links which have been set to active mode in each link group (330).

The link status monitoring unit 120 may manage two thresholds, that is, an idle_threshold and a busy_threshold, and generally, the idle_threshold is greater than the busy_threshold. When the calculated average traffic length is smaller than the idle_threshold (340) or is greater than the busy_threshold (350), the link status monitoring unit 120 notifies the link group management unit 100 of the result.

When receiving the notification that the average link length is smaller than the idle_threshold, the link group monitoring unit 100 determines that the amount of traffic flowing into the link group is smaller than the number of the physical links in active mode, selects an appropriate number of physical links to be switched from active mode to power save mode, and notifies the traffic distribution unit 110 of the selection result (341).

The traffic distribution unit 110 redistributes the packet traffic flowing through the selected physical links which are to be switched from active mode to power save mode to the rest of the physical links in active mode, and notifies the link group management unit 100 of the redistribution result (342).

When the link group management unit 100 is notified of completion of the traffic redistribution, the link group management unit 100 switches the active mode of the selected physical links to power save mode (343). When the mode of particular links in a link group is set, a peer system which is connected through the particular links is required to set a mode of the corresponding links to the same mode, and the above link mode setting may be implemented through negotiation by mutual communication between both systems or through setting by use of an external control server.

When the link group management unit 100 receives notification that the average link buffer length is greater than the busy_threshold, the link group management unit 100 determines that the physical links of the link group which have been set to active mode are not sufficient for the traffic, selects an appropriate number of physical links to be switched from power save mode to active mode (351), switches the selected physical links from power save mode to active mode, and notifies the traffic distribution unit 110 of the operation result (352).

In this operation, the traffic distribution unit 110 redistributes the traffic that has been previously transmitted to the physical links in active mode to the selected physical links which have been switched from power save mode to active mode (353).

As described above, the communication system groups physical links into link groups, and in the case of a link group-based communication method that manages one high bandwidth link group, the number of physical links for transmission is adjusted according to the amount of traffic traveling toward the link group and the rest of the physical links in the link group are set to an idle state to be in power save mode. Accordingly, efficient power reduction in link group-based communication can be realized.

The current embodiments can be implemented as computer readable codes in a computer readable record medium. Codes and code segments constituting the computer program can be easily inferred by a skilled computer programmer in the art. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it may be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A link group-based communication apparatus in a communication system that transmits and receives packets to/from an adjacent node connected with a plurality of physical links, comprising:

the link group-based communication apparatus being implemented via a computer and including:

a link group management unit configured to group the plurality of physical links to form a link group supporting multi-rate mode links, and set a selected of the physical links belonging to the link group to active mode for packet transmission and the rest of the physical links to power save mode in which the physical links do not perform packet transmission, according to a comparison of an average traffic amount of transmission through various rates of the link group and a rate to perform the packet transmission;

a traffic distribution unit configured to distribute packets to the selected physical links of the link group currently activated for the packet transmission and transmit the packets through the activated physical links to the adjacent node;

link buffers configured to be placed at front ends of the respective physical links and temporally store packets distributed from the traffic distribution unit such that the packets are transmitted through the physical links; and a link status monitoring unit configured to calculate an average of lengths of link buffers which are connected with active mode physical links belonging to the link group, and measure an average amount of traffic transmitted through the selected of the physical links activated for the packet transmission using the average of lengths, and transmit the measured average traffic amount to the link group management unit.

2. The link group-based communication apparatus of claim 1, wherein the plurality of physical links comprise at least one group of physical links having the same transfer rate, and at least one group of physical links having different transfer rates.

3. The link group-based communication apparatus of claim 1, wherein the link group management unit is further configured to switch a mode of each of physical links belonging to one link group from active mode to power save mode or from power save mode to active mode according to the average traffic amount received from the link status monitoring unit.

4. The link group-based communication apparatus of claim 3, wherein the traffic distribution unit is further configured to, when the link group management unit switches the mode of physical links from active mode to power save mode, redistribute traffic that has been distributed to the physical links which are switched to power save mode to physical links in active mode.

5. The link group-based communication apparatus of claim 3, wherein the traffic distribution unit is further configured to, when the link group management unit switches mode of physical links from power save mode to active mode, redistribute some traffic that has been distributed to physical links which were previously set to active mode to the physical links which are switched to active mode.

6. The link group-based communication apparatus of claim 1, wherein the average of lengths of link buffers is calculated at set intervals and a moving average of the calculated average length at the set intervals is calculated for a time window period of a specific length.

7. A link group-based communication method of a communication system that transmits and receives packets to/from an adjacent node connected through a plurality of physical links, the link group-based communication method comprising:

forming a link group including the plurality of physical links supporting multi-rate mode links;

setting a selected of the physical links of the link group to active mode to perform packet transmission and a rest of the physical links to power save mode in which the physical links do not perform the packet transmission, according to a comparison of an average traffic amount of transmission through various rates of the link group and a rate to perform the packet transmission;

distributing packets to the active mode physical links of the link group and transmitting the packets through the active mode physical links;

measuring an average amount of traffic transmitted through the active mode physical links of the link group by calculating an average of lengths of link buffers, which are connected with the active mode physical links; and switching a mode of physical links from active mode to power save mode or from power save mode to active mode, according to the measured average traffic amount.

8. The link group-based communication method of claim 7, wherein the average of lengths of link buffers is calculated at set intervals and a moving average of the calculated average length at the set intervals is calculated for a time window period of a specific length.

9. The link group-based communication method of claim 8, further comprising:

when the average of lengths of link buffers used for storage is smaller than a previously set minimum threshold, selecting physical links to be switched from active mode to power save mode from among the active mode physical links of the link group according to a difference between the minimum threshold and the average of lengths of link buffers used for storage;

redistributing traffic which has been previously allocated to the selected physical links to the active mode physical links other than the selected physical links; and switching a mode of the selected physical links to power save mode.

10. The link group-based communication method of claim 8, further comprising:

when the average of lengths of link buffers used for storage is greater than a previously set maximum threshold, selecting physical links to be switched from power save mode to active mode from among power save mode physical links of the link group according to a difference between the maximum threshold and the average of lengths of link buffers used for storage;

switching a mode of the selected physical links to active mode; and redistributing some traffic to be transmitted through physical links which have been previously set to active mode to the physical links switched to active mode.

* * * * *